Figure 1:
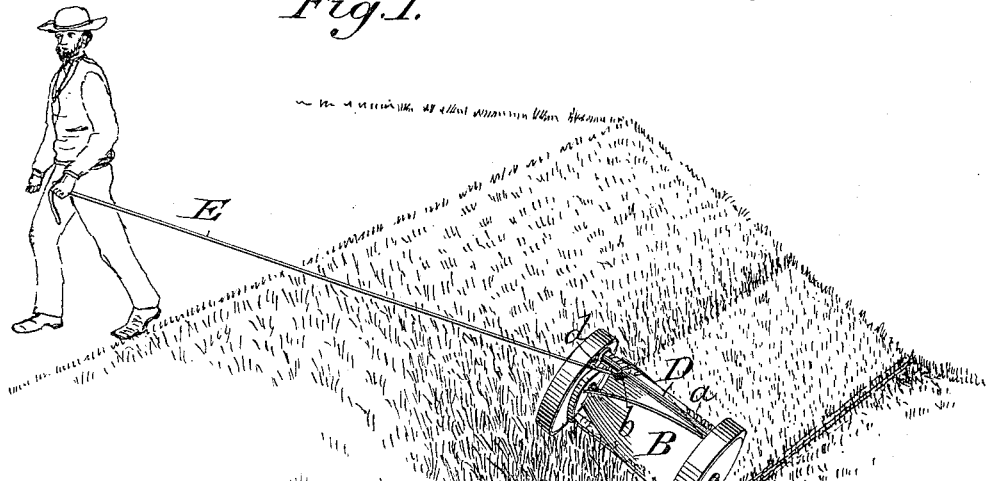

(No Model.)

W. L. WOODRUFF.
LAWN MOWER.

No. 362,862. Patented May 10, 1887.

Witnesses
F. H. Schott
S. V. Chandler

Inventor
William Lippincott Woodruff.
By his Attorney W. F. E. Chandler

UNITED STATES PATENT OFFICE.

WILLIAM LIPPINCOTT WOODRUFF, OF TOWANDA, PENNSYLVANIA.

LAWN-MOWER.

SPECIFICATION forming part of Letters Patent No. 362,862, dated May 10, 1887.

Application filed January 15, 1887. Serial No. 224,465. (No model.)

*To all whom it may concern:*

Be it known that I, WILLIAM LIPPINCOTT WOODRUFF, a citizen of the United States, residing at Towanda, in the county of Bradford and State of Pennsylvania, have invented certain new and useful Improvements in Lawn-Mowers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in lawn-mowers, by which they are made capable of operating upon the slope of a terrace or other inclined surface with the same speed and almost equal facility as that with which they are operated on a level.

Heretofore, so far as my knowledge extends, lawn-mowers have been operated upon inclined surfaces by pushing them up from the lower side by means of the handle or by letting them down from the top and then pulling them back by means of a rope.

By the first method only terrace banks whose height was not greater than the length of the handle would be conveniently cut, and by the last-named method, as there was nothing to guide the machine, it was liable, instead of cutting parallel swaths, to run in a crooked or zigzag course.

To obviate the inconvenience of operating a lawn-mower in either of these methods is the object of my invention, which consists, essentially, in attaching to the machine a notched bar having a rope movably attached thereto and by which it is drawn forward, the position of said rope in the notches of the bar regulating the position of the mower upon the inclined surface of the bank, along which it is drawn by the operator, walking along the top of the bank or terrace.

Suitable projections or guards are also attached to the wheel-covering plates to prevent the abrasion of the rope by contact with the wheels, and to enable it to prevent the machine from turning over in its forward movement. By this arrangement it will be seen that the machine is operated by a side draft and moves in a parallel line to that followed by the operator, the position of the rope in the notches of the bar and the steepness of the bank determining the angle of inclination of the line pursued by the machine to said rope, and the length of the rope determining the distance between the line followed by the person operating and that followed by the machine.

In the accompanying drawings similar letters of reference indicate like parts in the different figures.

Figure 2:
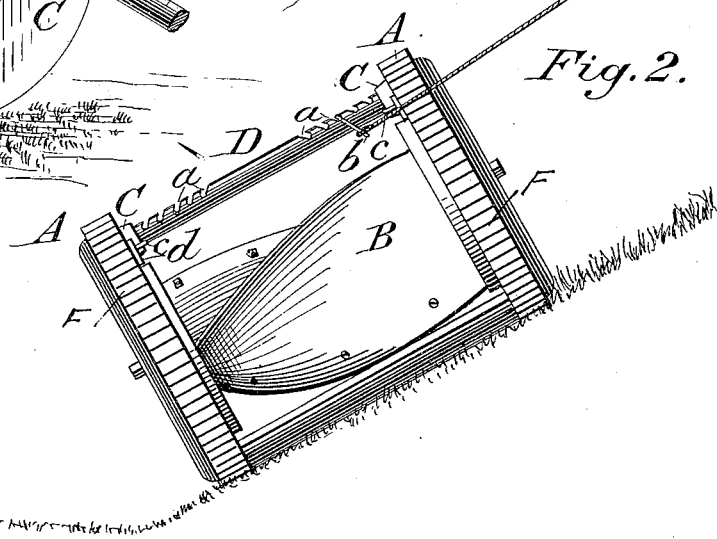

Figure 1 is a perspective view of the machine in operation upon the sloping bank of a terrace, showing the manner in which the draft-rope is attached to the notched bar in order to make the machine follow a line parallel to the path of the operator. Fig. 2 is a front elevation illustrating the relative position of the parts; and Fig. 3 is a detail view in perspective of one of the wheels, its covering-plate, the notched bar, rope, guard-plate, and pin.

The lawn-mower to which these devices are attached may be of any of the various kinds commonly in use; but for the purpose of illustration I have taken one known to the trade as the "Philadelphia" lawn-mower, in which the wheels are provided with internal gear acting upon a pinion which drives the spiral cutter. These machines are all provided with a handle by which they are propelled, but which is removed when it is to be operated by my improved mechanism.

Figure 3:
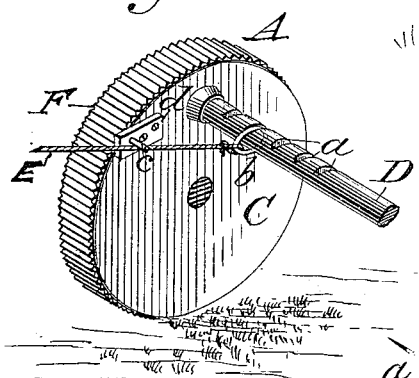

A A are the wheels of the machine, which are preferably corrugated on their peripheries, as shown at F, Fig. 3, and B the cutter, provided with the ordinary spiral cutter and rotated by the wheels. A plate, C, upon the inside of each of the wheels A, forms the journal-bearings for the axle and also for the shaft of the spiral cutter. To these plates C C the handle is attached when the machine is to be propelled in the ordinary manner. In my improved machine the plates C C are connected in front of the spiral cutter by a bar, D, at each end of which is a series of inclined notches, *a a*, which receive the ring *b*, attached to one end of the draft-rope E.

It will be apparent that the draft-rope may be attached to the machine at a greater or less distance from the center line of draft on either side, as may be desired. Shifting the ring from one notch to the next upon either end of the bar will cause the machine to occupy a position of greater or less inclination to the path pursued by the operator. These notches $a$ $a$ in the draft-bar D are preferably made at such a distance from each other as to cause the machine to run squarely on terrace banks of different inclinations.

The length of the rope between the operator and the machine can be changed sufficiently to shift the position of the machine a distance equal to the width of swath cut, so that the operator may walk back and forth in the same line at the top of the bank, and by shifting the position of the ring upon the draft-bar at each end of the swath and the length of rope used he can cause the machine to cut over the whole of the inclined surface of a terrace bank.

It is evident that the draft-rope will come in contact with a corner of one of the wheels and be abraded thereby if there were no means of preventing it; and that after the removal of the handle the machine, having nothing to steady it, would be liable to tilt forward. To prevent these accidents, I attach to each of the plates C C in front of the draft-bar a guard-plate, $d$, which projects outward beyond the periphery of the wheels and prevents the rope from coming in contact with them. These guard-plates are also each provided with a projecting pin, $c$, beneath which the rope passes, thus preventing any serious forward-tilting movement of the machine. As such a movement would only take place when the machine is being drawn forward the draft upon the rope would render the same taut, so that it would present a slightly yielding resistance to such movement when by the tilting of the machine the pin was brought in contact with the rope.

Having thus described my invention, I claim as new and desire to secure by Letters Patent the following:

1. As an improvement in lawn-mowers, the draft mechanism, consisting of the notch-bar, draft-rope movably attached to said bar, guard-plate, and pin, all combined and arranged, substantially as set forth, to allow movement of the machine in a line parallel to that followed by the operator, but at a distance therefrom, as specified.

2. In a lawn-mower, the combination, with the plates C C, of the bar D, provided with a series of inclined notches, $a$ $a$, the guard-plate $d$, having pin $c$, and the rope E, having a ring, $b$, at one end for engagement with the notches of the bar, as set forth.

3. In a lawn-mower, the combination of a transverse draft-bar, a rope adjustably attached to said bar, and the guard-plate and pin for guiding and preventing contact of said rope with the wheels when the mower is operated, in the manner as substantially set forth.

In testimony whereof I affix my signature in presence of two witnesses.

WILLIAM LIPPINCOTT WOODRUFF.

Witnesses:
 M. T. E. CHANDLER,
 M. A. BALLINGER.